United States Patent [19]

F'Geppert

[11] Patent Number: 4,569,234

[45] Date of Patent: Feb. 11, 1986

[54] TORQUE SENSOR

[75] Inventor: Erwin F'Geppert, Oakland, Mich.

[73] Assignee: The United States of America as represented by the Secretary of the Army, Washington, D.C.

[21] Appl. No.: 647,324

[22] Filed: Sep. 4, 1984

[51] Int. Cl.[4] .................. G08B 21/00; G01L 3/14
[52] U.S. Cl. .................... 73/862.19; 73/862.31; 340/665
[58] Field of Search ........... 73/862.19, 862.31, 862.49; 307/124

[56] References Cited

U.S. PATENT DOCUMENTS

| | | | |
|---|---|---|---|
| 3,894,245 | 7/1975 | Hogue et al. ................. | 307/124 |
| 3,946,603 | 3/1976 | Houvouras ................... | 73/862.19 |
| 4,435,988 | 3/1984 | Corry et al. .................. | 73/862.19 |
| 4,454,504 | 6/1984 | Jocz ........................... | 73/862.31 X |

FOREIGN PATENT DOCUMENTS

| | | | |
|---|---|---|---|
| 0427243 | 9/1948 | Italy ........................... | 73/862.19 |
| 0137724 | 8/1983 | Japan ......................... | 73/862.31 |
| 0420892 | 3/1974 | U.S.S.R. ..................... | 73/862.19 |

*Primary Examiner*—Charles A. Ruehl
*Attorney, Agent, or Firm*—Peter A. Taucher; John E. McRae; Robert P. Gibson

[57] ABSTRACT

In a rotary drive system, mechanical means for sensing turning torque generated by the load forces. The sensing means is designed to operate with minimal effect on normal operation of the drive system.

1 Claim, 1 Drawing Figure

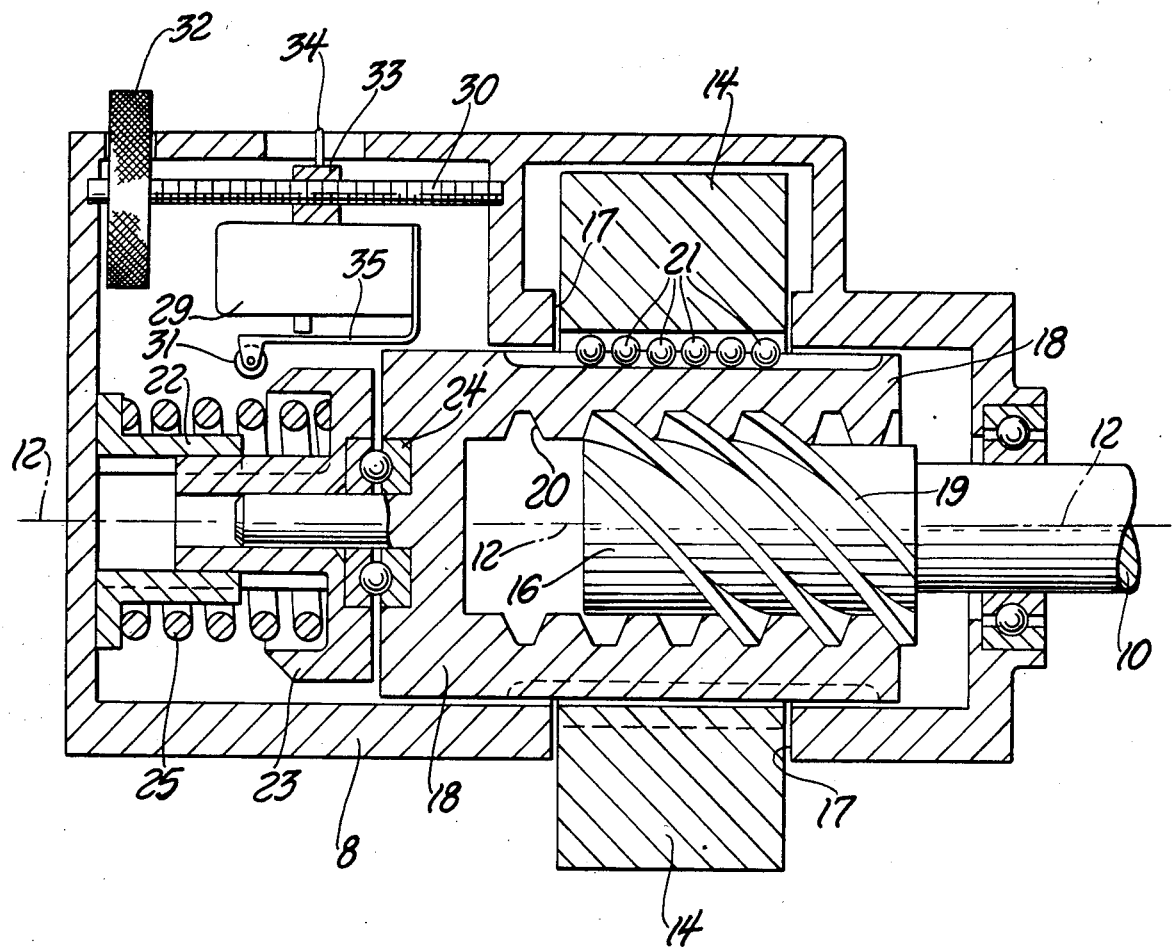

TORQUE SENSOR

GOVERNMENT INTEREST

The invention described herein may be manufactured, used, and licensed by or for the Government for governmental purposes without payment to me of any royalty thereon.

BACKGROUND AND SUMMARY

This invention relates to a device for sensing the torque developed during operation of a rotary drive system. The invention can be employed in various drive systems, e.g., automotive engine-transmission power plants, electric motor-operated tools, and metal cutting machines. In such drive systems, the torque-sensing feature may be useful for actuation of various control devices, such as electric switches, mechanical clutches, brake actuators, fluid control valves, or audible alarms. The torque-sensing function can be used for safety overload relief, motor de-energization, engine fuel control, transmission clutch actuation, remote alarm signal, tool breakage signal, etc.

Torque responsive systems are already known. For example, U.S. Pat. No. 1,953,182 to Lyon discloses an overload release mechanism wherein torque overloads mechanically disconnect the driven member from the drive member. In the Lyon patented arrangement, three radially oriented rollers are arranged so that during normal operations, each roller extends partly into a groove in the drive member and partly into a groove in the driven member; a spring urges the rollers more deeply into the grooves. Under overload conditions, the driven member tends to lag behind the drive member; at some overload point, the driven member exerts sufficient retarding force on the rollers to cause them to cam out of the driven member grooves against the spring force, thereby interrupting the driving connection between the drive and driven members.

U.S. Pat. No. 4,050,328 to R. Romick discloses a drive system that includes a drive shaft 66 having friction disk means disposed thereon within a driven member 68; spring means 146 urges the disk means to a drive-transmitting position. When an overload condition occurs, the spring means is unable to handle the overload force; the disk means then tends to spin within the driven member.

These patentend arrangements contemplate that when the torque setting is reached, the driven member will be mechanically spearated from the drive member. My contemplated apparatus differs from the patented arrangements in that no mechanical disconnection of the drive and driven members takes place when the torque setting is reached; the apparatus continues to transmit the drive force. The useful output of the torque-sensing apparatus is an electrical signal representative of the sensed torque condition. The apparatus has special usefulness where it is desired to keep the driven member operating when/after the torque setting is reached. The electric signal (representative of the sensed torque) can be used to operate or control various devices, such as alarms, fluid valves, motors, or clutches.

THE DRAWINGS

The single FIGURE is a sectional view taken through a preferred embodiment of the invention.

DETAILED DESCRIPTIION

Referring more particularly to the FIGURE, there is shown a rotary drive system that includes a housing 8 designed to support the rotary drive components. The drive components include an input drive shaft member 10 rotatable on axis 12, and an output driven member 14 rotatable on the same axis 12. Member 14 can, in practice, be a gear, sprocket, pulley, crank arm, cam or similar member connected to an associated tool (not shown).

The drive connection between input shaft member 10 and output member 14 consists of two helical screws 16 and 18. Screw 16 is integral with, or otherwise rigidly attached to, input member 10. Screw 18 is an annular member having internal helical threads 20 in mesh with helical threads 19 formed on screw 16. Screw 18 is connected to output member 14 via a key means 21 that enables screw 18 to undergo a helical motion while member 14 is confined to rotary motion (by housing surfaces 17); key means 21 is shown in the drawing as a ball spline mechanism having anti-friction elements designed to minimize friction power loss while member 18 is moving helically. Member 18 can be considered as a nut, rather than a screw.

Disposed leftwardly from screw 18 is an annular abutment structure 23; a compression spring 25 biases the abutment structure rightwardly toward screw 18. Stationary splined guide member 22 interacts with spline grooves on structure 23 to confine structure 23 to rectilinear motion along axis 12. An anti-friction thrust bearing 24 is interposed between abutment structure 23 and the left end face of screw 18, whereby the screw can rotate without transmitting rotational force to structure 23. Structure 23 is considered an abutment structure in the sense that it "abuts" member 18 in end-to-end relationship.

The helical threads on screws 16 and 18 are oriented so that the turning torque applied by shaft 10 is accompanied by a right-to-left operating force from screw 18 onto abutment structure 23. The right-to-left operating force is opposed by a counterbalancing force generated by coil spring 25. The two forces are essentially equal (or can be made equal by axial motion of screw 18). Screw 16 transmits rotational force from shaft member 10 to screw 18 and the associated output member 14; axial load forces on screws 16 and 18 are absorbed by spring 25. The axial and rotational load forces rise and fall together; a high rotational (torque) loading is accompanied by a proportionally high axial loading, while a low rotary torque loading is accompanied by a proportionally low axial loading.

The axial force developed by coil spring 25 is generally proportional to the spring deflection (compression). Therefore, spring deflection, in a right-to-left direction, is proportional to the torque loading on the prime mover that drives shaft 10. As the torque increases abutment structure 23 moves in a leftward direction; should the torque decrease the abutment structure moves to the right. When the load is stable (unchanging), screw 18 and structure 23 maintain their positions of axial adjustment.

Various types of control means can be located in the path of abutment structure 23 to be actuated (triggered) at selected points in the abutment structure motion, e.g., a rheostat or valve flow control element. The FIGURE illustrates the control as an electric control switch 29 having a switch-actuating roller member 31 carried on a spring leaf arm 35. As structure 23 moves to the left, it deflects roller 31 upwardly, thereby actuating switch 29.

Switch 29 will be positioned at a particular point alongside the motion path of structure 23 so that the switch will be actuated when the detected torque is at a particular valve. If the device is being used as an alarm the switch-actuating point will be at the upper safe limit of transmitted torque; the switch could, for example, be used as an audible alarm, or in a control circuit for automatic de-energization of the prime mover, or automatic actuation of a brake mechanism.

Switch 29 may be located in a fixed position along the motion path of structure 20. However, the switch position may also be adjusted or varied to thereby adjust the torque setting of the detecting system. The FIGURE illustrates a switch position-adjustment means that comprises a screw 30 having a manually-accessible thumbwheel 32 for screw turn purposes. Switch 29 is affixed to a nut 33 that is adapted to travel along screw 30 when wheel 32 is turned; guide means (not shown) is used to prevent nut 33 from turning with screw 30. A pointer 34 may extend from nut 33 through a slot in the housing wall to indicate the torque setting.

Abutment structure 23 is oriented to switch 29 such that after switch actuator 31 has been deflected (to actuate the switch) structure 23 can still continue to move in a right-to-left direction. The torque-responsive means is thus suited for control of various devices other than the device being used to power shaft 10. However, if shaft 10 is being powered by an electric motor, then switch 29 could be located in the motor-control circuit to de-energize the motor and/or vary the motor speed at some particular torque condition.

It should be noted that the torque-detecting means (structures 23 and 25) senses the torque without being directly in the power-transmission path. The power path is from screw 16 through screw 18 into output member 14, whereas torque sensing takes place as a motion induced in structure 20. Torque sensing is accomplished without materially interferring with the power-transmission function. Anti-friction thrust bearing 24 minimizes frictional power loss associated with the torque sensing function. Ball splines 21 minimizes any frictional power loss that might occur during movement of the screw 18 along axis 12.

Switch 29 constitutes a control means responsive to motion of abutment structure 23. The entire sub-assembly, comprised of abutment structure 23, guide 22, spring 25, and switch 29, may be considered as a means responsive to axial motion of screw 18 for generating a control signal related to the magnitude of the screw axial motion and torque developed in the drive system.

I wish it to be understood that I do not desire to be limited to the exact details of construction shown and described for obvious modifications will occur to a person skilled in the art, without departing from the spirit and scope of the appended claims.

I claim:

1. In a rotary drive system, the combination comprising a nonslidable input drive shaft (10) mounted for rotation around its axis; a helical screw (16) affixed to one end of said input drive shaft; a hollow nut (18) having an internal helical thread (20) in meshed engagement with said helical screw; an annular output driven member (14) surrounding said nut; said nut having spaced end faces defining the general nut plane; said output member being supported on said nut within the general nut plane; axial ball spline means (21) interposed between the outer surface of the nut and the inner surface of the annular output member, whereby said nut is enabled to have axial motion on the helical screw while transmitting a rotary force to the output member; means (17) restraining the output member against axial motion parallel to the axis of the helical screw; a stationary guide means (22) located in axial alignment with the input drive shaft, said guide means being axially spaced from the input shaft and associated helical screw; an abutment structure (23) slidably mounted on said stationary guide means for rectilinear motion along an axis coincident with the shaft axis; an anti-friction thrust bearing (24) between the nut and the abutment structure enabling said nut to move the abutment structure rectilinearly without interferring with nut rotation; a compression coil spring surrounding the stationary guide means and operatively engaged with the abutment structure to bias said structure in a direction opposing axial dislocation of the nut due to the driving force applied thereto by the helical screw; a control switch (29) positioned alongside the path taken by the abutment structure, said control switch having an actuating member (35) projecting into the path of the abutment structure whereby the switch is actuable at a predetermined point in the abutment structure motion; and means (32, 30, 33) for adjusting the switch position along the path taken by the abutment structure to vary the torque setting of the switch.

* * * * *